United States Patent [19]
Van Mil

[11] 3,755,854
[45] Sept. 4, 1973

[54] DEVICE FOR REMOVING THE METATARSUS AND THE ACHILLES TENDON FROM POULTRY

[75] Inventor: Martinus Petrus Gerardus Van Mil, Boxmeer, Netherlands

[73] Assignee: Stork Amsterdam N.V., Amstelveen, Netherlands

[22] Filed: Sept. 27, 1971

[21] Appl. No.: 184,148

[30] Foreign Application Priority Data
Sept. 28, 1970 Netherlands .................. 7014260

[52] U.S. Cl. .................................................. 17/11
[51] Int. Cl. ............................................. A22b 3/08
[58] Field of Search ......................................... 17/11

[56] References Cited
UNITED STATES PATENTS
3,213,488  10/1965  Volpe ................................. 17/11

*Primary Examiner*—Robert Peshock
*Attorney*—Richard E. Babcock, Jr., Lawrence R. Radanovic et al.

[57] ABSTRACT

A device for removing the metatarsus and the achilles' tendon from poultry hanging on a conveyor track with means for breaking the metatarsus and with a drawing member positioned under the conveyor and moving synchronously therewith, acting directly above the joint between the metatarsus and the tibia and directed away from the conveyor over a vertical distance exceeding the length of the metatarsus below the point at which it is suspended.

2 Claims, 3 Drawing Figures

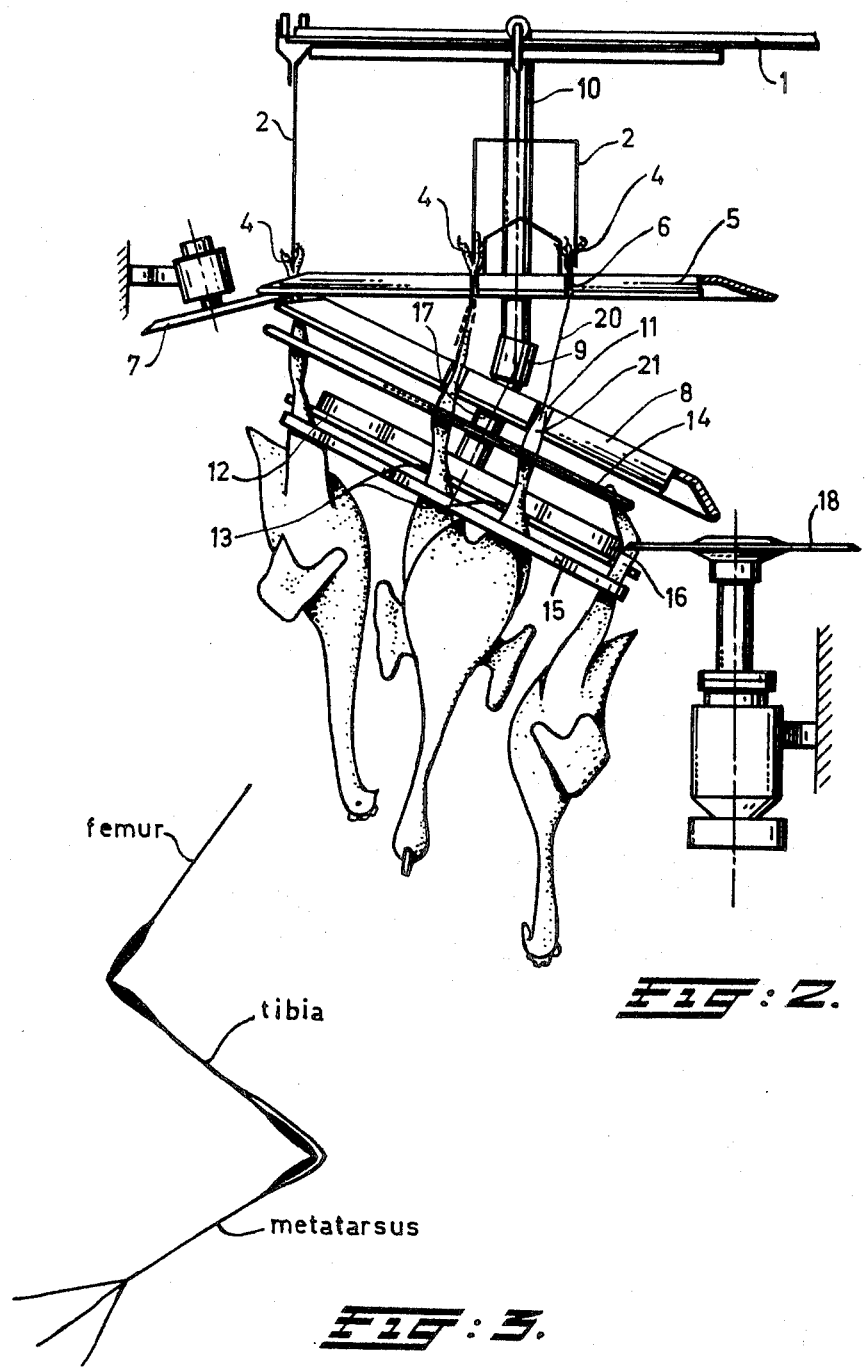

DEVICE FOR REMOVING THE METATARSUS AND THE ACHILLES TENDON FROM POULTRY

DISCUSSION OF THE PRIOR ART

The invention relates to a device for removing the metatarsus and the Achilles' tendon of poultry hanging by the foot part on a conveyor with the head facing downwardly.

Usually such a device comprises a cutting knife arranged beside the conveyor, which simply cuts through the joint between the metatarsus and the shin bone, including the Achilles' tendon at that location. This tendon is, however, particularly in larger birds like turkeys, very tough and is therefore an obstacle for bending open the joint. This bending, however, is useful in preventing the knife from touching the bone, and to assure that the knife will only cut through the skin at the exact location.

SUMMARY OF THE INVENTION

It is an object of the invention to provide a device for removing the Achilles' tendon before cutting through the above-mentioned joint, so that this joint, before being severed, can be opened entirely and the knife need only cut through the skin.

This object is attained according to the invention by means of a device having an inlet directly under the conveyor, a breaking member for breaking the metatarsus directly under the point of suspension, and a drawing member vertically under the conveyor and moving synchronously therewith. The drawing member acts directly above the joint between the metatarsus and the tibia and, from the inlet, moves away at an angle from the conveyor to a distance exceeding the length of the metatarsus below the point of suspension. Preferably a supporting member is disposed above the drawing member for supporting the metatarsus foot portion. It is obvious that, after breaking the metatarsus, the drawing member draws apart the two halves thereof. It has been found that, during this operation, the entire Achilles' tendon, together with the metatarsus, is also pulled along from the joint between the metatarsus and the shin bone. As a result the joint can be severed more easily, and, in addition thereto, the quality of the bird as treated is improved.

In order to assure that the conveyor is not exposed to too great a load during the drawing operation, the device preferably comprises a supporting member for supporting the metatarsus' foot parts hanging on the conveyor, placed above the drawing member. In this way the shackle by which the birds are usually hung by their toes is sufficiently supported in order to prevent a load from being applied to the conveyor into an undesired direction.

In a device proposed hereinbefore, designed for a horizontal conveyor, a proper grip on the two halves of the metatarsus is obtained during the drawing operation with the supporting member comprising a horizontally arranged inverted saucer-shaped supporting disc with recesses in the downwardly turned rim. The drawing member therein comprises an inverted saucer-shaped drawing disc with recesses in the downwardly directed rim, and the breaking member comprises a free wheel, inserted aslant between the rim of the supporting disc and the rim of the drawing disc, which extends within the recesses, while the supporting disc and the drawing disc are rotatably supported with a common drive. In this way the aforementioned shackles of the conveyor are gradually supported by the supporting disc when they enter the device while, during the drawing operation, a force directed towards the axis of the drawing disc is active on the aforementioned joint, so that the legs remain in the recesses. The freewheel will prevent the elongation of the Achilles' joint from being severed, although the metatarsus bone is duly broken, so that during the drawing operation the Achilles' tendon is effectively pulled from the joint.

Since, finally, the metatarsus foot part is completely pulled loose from the remainder of the bird, the resting part of the metatarsus must be severed in a special way, while measures should be taken to prevent the birds — now no longer being suspended from the conveyor — from falling down. For such purpose, the device according to the invention comprises a clamping member under the drawing member which is synchronously movable therewith, and which is capable of clamping the legs of the bird on either side of the joint, between the metatarsus and tibia, against fixed guides arranged on either side of the clamping member. A cutting knife is provided directly ahead of the exit opposite the clamping member for cutting through the joint. It is obvious, that the joint is bent open and the cutting disc need only sever the skin at the location in question, whereupon the bird falls down.

In order to ensure a co-operation with the cutting disc without slip, and to ensure that the joint to be severed is sufficiently bent open, the clamping member preferably comprises a ring or disc which is coaxially coupled with the drawing disc and which has recesses in the rim extending as far as a circle, the radius of which is greater than the radius of curvature of at least one of the circular guides. On the upper surface of this ring or disc, a coaxial edge is provided, the diameter of which is approximately equal to the one of the aforementioned circle, and the edge of the cutting knife is situated at a minimal distance from this edge at the lowest point of the clamping member.

BRIEF DESCRIPTION OF THE DRAWINGS

FIG. 2 is a side elevational view of an embodiment of the invention.

FIG. 3 schematically shows a leg of the bird.

Figure 1:
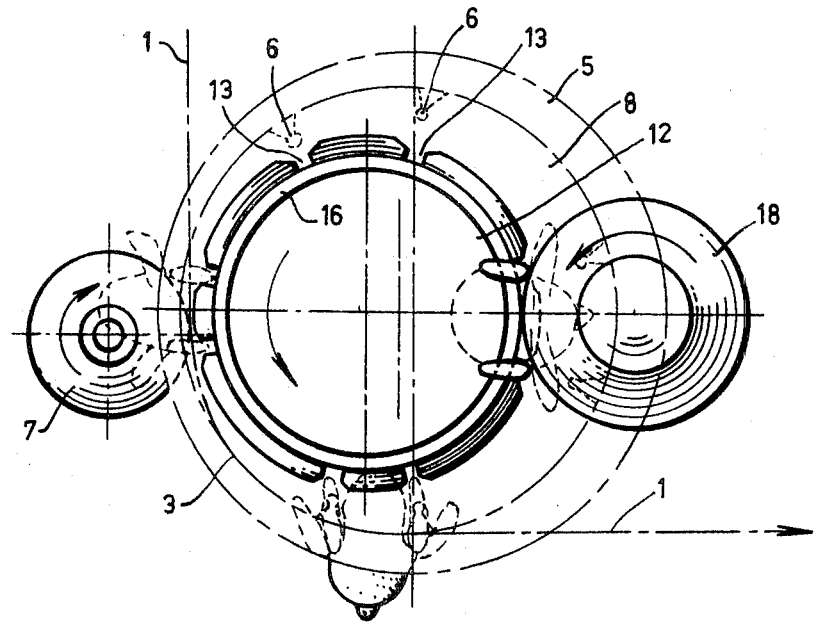
FIG. 1 is a schematic plan view of the device according to the invention.

It should be noted that for illustrative purposes in FIG. 1, some parts have only been depicted in dotted lines, so as to allow for the visibility of parts situated thereunder.

DESCRIPTION OF A PREFERRED EMBODIMENT

As shown in the Figures, the birds are horizontally conveyed by means of a conveyor 1, hanging on shackles 2. At the location of the device according to the invention, the conveyor 1 curves along an arc of 90°. The direction of transport is indicated by the straight arrow in FIG. 1. The metatarsus of the foot bears in the shackle 2 in which the toes of the leg are clamped and, at the location of the device, the shackles 2 with the metatarsus 4 bear on the supporting disc 5, in which the metatarsus is slid into recesses 6. At the inlet and directly under the rim of the supporting disc 5 a breaking wheel 7 is provided between the disc 5 and the drawing disc 8, which is inclined downwardly from the inlet, and is connected via a universal joint 9 with the supporting disc and the drive 10. The discs 5 and 8 rotate synchronously with the conveyor 1. It is obvious that the recesses 11 in the rim of the drawing disc 8 lag slightly with respect to the recesses 6 in the supporting disc 5. The recesses 11 in the bent-over edge of the drawing disc 8 receive the joints between the metatarsus and the tibia, the joints remaining under the disc so that during the drawing operation, a force directed toward the axis is exerted on the joint.

A clamping disc 12 is provided under disc 8 on the shaft thereof, recesses 13 being provided in the rim of disc 12 which, with respect to the recesses 11, are staggered in such a way that the legs of the bird can be received therein. Curved guide rods 14, 15, respectively of circular shape, are mounted above and below disc 12, the radius of curvature of the guide 14 being smaller than the greatest radius of the clamping disc 12. The radius of curvature of the lower guide 15 corresponds to the aforementioned radius of the disc 12. On the upper side of the clamping disc an edge or rim 16 is welded, the outer diameter of which is slightly smaller than the diameter of the pitch circle outside of which the recesses 13 are provided. It should be noted that the guides 14 and 15 cover the lower half of the circle in FIG. 1, and that the upper guide 14 is situated in the proximity of the inlet at a greater distance from the shaft 17, by which the clamping disc 12 is coupled to the drawing disc 8, than in the proximity of the exit at which the cutting disc 18 is situated. This cutting disc with its rotatingly driven cutting edge is approximately horizontally arranged in front of the edge 16 and at a minimal distance therefrom. The cutting disc 18 is diametrally opposite the breaking wheel 7 and in the proximity of the lowest point of the clamping disc 12.

As is apparent from FIG. 3, a leg of a bird consists of a thigh bone or femur, a shin bone or tibia and the foot or metatarsus, and a number of toes. Between the tibia and the metatarsus lie the joint to be severed and the tough Achilles' tendon.

The device shown in the FIGS. 1 and 2 operates as follows:

The birds are fed forward by means of the conveyor 1 and the metatarsus is broken between the toes and the Achilles' tendon joint. The elongation of the Achilles' tendon in the metatarsus is, however, not severed, so that subsequently the supporting disc 5 and the drawing disc 8, moving apart, draw the Achilles' tendon from the joint as is visible at 20. The joint 21 remains then behind the bent-over edge of the drawing disc 8. After pulling loose the Achilles' tendon the entire metatarsus foot part is loosened from the other part of the bird, and the upper sides of the metatarsus on the tibia are clamped between the fixed guides 14 and 15 and the clamping disc 12. During the further rotation of the clamping disc 12, and under the influence of the weight of the bird, the tibia slips downwards until the joint comes to bear against the edge 16 of the clamping disc 12, and the tibia and the metatarsus make an angle in such a way that the joint is sufficiently bent open, so that it can be easily severed by means of the cutting disc 18 without touching bone. As a consequence, no splinters of the bone penetrate the flesh. The bird falls down, after the joint has been severed between tibia and metatarsus, at the location of the exit which is situated directly opposite the inlet. The metatarsus foot part on the contrary, is discharged, as is apparent from FIG. 1, halfway between the inlet and the exit by means of the advancing conveyor 1.

What I claim is:

1. A device for removing the metatarsus portion and the Achilles' tendon from the feet of poultry products, which products are each suspended by their feet from a conveyor, comprising: drawing means rotatably mounted below the conveyor; a breaking wheel freely mounted at the inlet of said drawing means for breaking the metatarsus between the foot and the joint to the tibia of each product; said drawing means comprising a first, horizontally positioned and inverted saucer-shaped supporting disc, said disc having spaced cutouts in the rim portion thereof along its periphery for the reception of the metatarsus of each poultry product; said drawing means further comprising a second, inverted saucer-shaped drawing disc located beneath said first disc and lying in a plane sloping toward said inlet, said second disc having cutouts in the rim portion thereof along its periphery spaced similarly with respect to said first disc cutouts for the reception of the joint between the metatarsus and the tibia; said discs being interconnected for rotation together whereby, during such rotation, the Achilles' tendon is drawn from the joint of each poultry product.

2. The device according to claim 1, further comprising a circular clamping disc spaced from and mounted to said second disc, said clamping disc having cutouts in the rim portion thereof along its periphery each aligned with the respective cutouts in the rim portion of said second disc, curved guide rods mounted respectively above and below said second disc, the pitch circle of said clamping disc cutouts having a radius greater than the radius of curvature of one of said guide rods, an upstanding rim fixedly mounted on said clamping disc, the diameter of said rim being approximately equal to the diameter of the pitch circle, the upper sides of the metatarsus on the tibia of each poultry product being clamped between said guide rods and said clamping disc, and a cutting disc mounted for cutting operation near the lowest point of said clamping disc whereby, during rotation of said discs, the tibia of each poultry product slips downwardly until the joint thereof bears against said rim, the tibia and the metatarsus of each poultry product making an angle in such a manner that the joint thereof is sufficiently bent open so that it can be easily severed by said cutting disc without touching bone.

* * * * *